US008366120B2

(12) United States Patent
Hu

(10) Patent No.: US 8,366,120 B2
(45) Date of Patent: Feb. 5, 2013

(54) CHUCK FOR BIT

(76) Inventor: Bobby Hu, Taichung (TW)

( * ) Notice: Subject to any disclaimer, the term of this patent is extended or adjusted under 35 U.S.C. 154(b) by 1212 days.

(21) Appl. No.: 12/189,905

(22) Filed: Aug. 12, 2008

(65) Prior Publication Data

US 2009/0309316 A1 Dec. 17, 2009

(30) Foreign Application Priority Data

Jun. 11, 2008 (TW) ............................... 97121822 A

(51) Int. Cl.
*B23B 31/107* (2006.01)

(52) U.S. Cl. ............. 279/82; 279/66; 279/128; 279/904

(58) Field of Classification Search .................... 279/75, 279/82, 74, 128, 66, 71, 72, 81, 904; *B23B 31/107*
See application file for complete search history.

(56) References Cited

U.S. PATENT DOCUMENTS

| | | | | | |
|---|---|---|---|---|---|
| 1,124,981 | A | | 1/1915 | Weaver | 279/75 |
| 2,806,706 | A | | 9/1957 | Fitch | 279/79 |
| 3,251,605 | A | | 5/1966 | Ondeck | 279/82 |
| 3,375,860 | A | * | 4/1968 | Vosbikian et al. | 81/30 |
| 3,549,160 | A | * | 12/1970 | Etzkorn | 279/97 |
| 3,935,762 | A | * | 2/1976 | Tudisco | 81/177.85 |
| 4,107,949 | A | * | 8/1978 | Wanner et al. | 464/167 |
| 4,309,042 | A | * | 1/1982 | Fauth et al. | 279/75 |
| 4,535,658 | A | * | 8/1985 | Molinari | 81/177.85 |
| 4,627,761 | A | * | 12/1986 | Olson et al. | 403/324 |
| 4,629,375 | A | * | 12/1986 | Lieser | 408/239 R |
| 4,663,999 | A | * | 5/1987 | Colvin | 81/128 |
| 4,692,073 | A | * | 9/1987 | Martindell | 408/239 A |
| 4,824,280 | A | * | 4/1989 | Alter | 403/322.2 |
| 4,858,939 | A | * | 8/1989 | Riggs | 279/75 |
| 5,090,275 | A | * | 2/1992 | McCann | 81/177.85 |
| 5,146,643 | A | * | 9/1992 | Bojar et al. | 15/28 |
| 5,182,973 | A | * | 2/1993 | Martindell | 81/429 |
| 5,188,378 | A | * | 2/1993 | Erlenkeuser | 279/22 |
| 5,398,946 | A | * | 3/1995 | Quiring | 279/30 |
| 5,417,527 | A | * | 5/1995 | Wienhold | 408/239 R |
| 5,732,606 | A | * | 3/1998 | Chiang | 81/177.2 |
| 5,740,704 | A | * | 4/1998 | Payne | 81/60 |
| 5,934,384 | A | * | 8/1999 | Wang | 173/132 |
| 6,000,300 | A | * | 12/1999 | Plamondon | 81/90.2 |

(Continued)

OTHER PUBLICATIONS

German Patent Publication No. DE 2934428 C2, Sep. 30, 1989, 05 pages.

(Continued)

*Primary Examiner* — Eric A Gates
*Assistant Examiner* — Bayan Salone
(74) *Attorney, Agent, or Firm* — Alan Kamrath; Kamrath IP Lawfirm, P.A.

(57) ABSTRACT

A chuck includes a body having an engaging groove for releasably receiving a bit. A sleeve is mounted around and movable relative to the body along a longitudinal axis of the body between a coupling position in which the bit is retained in the engaging groove and a releasing position allowing removal or insertion of the bit. The sleeve further includes an engaging section that slideably abuts a coupling section of the body. The engaging section is engaged with the coupling section to allow joint rotation of the body and the sleeve about the longitudinal axis. The sleeve further includes a flange with a frictional outer periphery to provide friction when the sleeve is manually rotated about the longitudinal axis by rotating the frictional outer periphery. Furthermore, the flange can be gripped by a user to move the sleeve to the releasing position.

20 Claims, 12 Drawing Sheets

U.S. PATENT DOCUMENTS

| | | | | |
|---|---|---|---|---|
| 6,065,374 | A | 5/2000 | Taggart | 81/63.2 |
| 6,199,872 | B1 * | 3/2001 | Hasan | 279/30 |
| 6,270,085 | B1 * | 8/2001 | Chen et al. | 279/22 |
| 6,311,989 | B1 * | 11/2001 | Rosanwo | 279/75 |
| 6,325,393 | B1 * | 12/2001 | Chen et al. | 279/22 |
| 6,330,846 | B1 | 12/2001 | Strauch | 81/477 |
| 6,345,560 | B1 | 2/2002 | Strauch | 81/477 |
| 6,457,916 | B2 * | 10/2002 | Wienhold | 408/240 |
| 6,511,268 | B1 * | 1/2003 | Vasudeva et al. | 408/239 R |
| 6,637,755 | B2 * | 10/2003 | Chen et al. | 279/22 |
| 6,666,114 | B1 * | 12/2003 | Lin | 81/438 |
| 6,684,740 | B2 * | 2/2004 | Lin | 81/438 |
| 6,688,195 | B1 | 2/2004 | Hsien | 81/60 |
| 6,695,321 | B2 * | 2/2004 | Bedi et al. | 279/22 |
| 6,725,749 | B1 | 4/2004 | Liou | 81/438 |
| 6,808,182 | B2 * | 10/2004 | Lin | 279/74 |
| 6,840,143 | B1 * | 1/2005 | Lin | 81/438 |
| 6,874,791 | B2 * | 4/2005 | Chen et al. | 279/75 |
| 6,877,751 | B2 * | 4/2005 | Hsing | 279/14 |
| 6,929,266 | B2 * | 8/2005 | Peters et al. | 279/82 |
| 6,953,196 | B1 | 10/2005 | Huang | 279/75 |
| 6,966,562 | B1 | 11/2005 | Wienhold | 279/75 |
| 6,973,858 | B2 * | 12/2005 | Huang | 81/177.85 |
| 6,986,517 | B2 * | 1/2006 | Lin | 279/74 |
| 7,036,404 | B2 * | 5/2006 | Liou | 81/438 |
| 7,052,022 | B2 * | 5/2006 | Chudy et al. | 279/143 |
| 7,063,332 | B2 * | 6/2006 | Muller | 279/75 |
| 7,121,774 | B2 * | 10/2006 | Hirt et al. | 408/240 |
| 7,195,247 | B2 * | 3/2007 | Shu | 279/75 |
| 7,331,262 | B2 * | 2/2008 | Petit et al. | 81/438 |
| 7,392,727 | B1 * | 7/2008 | Chiang | 81/124.4 |
| 7,424,841 | B2 * | 9/2008 | Liu | 81/438 |
| 7,448,302 | B2 * | 11/2008 | Huang | 81/438 |
| 7,669,860 | B2 * | 3/2010 | Chiang | 279/143 |
| 7,752,946 | B2 * | 7/2010 | Wang | 81/125 |
| 7,891,275 | B2 * | 2/2011 | Huang | 81/438 |
| 7,913,592 | B2 * | 3/2011 | Hu | 81/438 |
| 7,942,426 | B2 * | 5/2011 | Peters | 279/143 |
| 8,172,236 | B2 * | 5/2012 | Shibata | 279/143 |
| 8,240,233 | B2 * | 8/2012 | Huang | 81/438 |
| 8,262,097 | B2 * | 9/2012 | Lai | 279/74 |
| 2003/0140744 | A1 * | 7/2003 | Chen | 81/438 |
| 2009/0309316 | A1 * | 12/2009 | Hu | 279/75 |
| 2009/0309317 | A1 * | 12/2009 | Hu | 279/82 |
| 2009/0311062 | A1 * | 12/2009 | Hu | 408/239 R |

OTHER PUBLICATIONS

German Patent Publication No. DE 20201012 U1, Jun. 13, 2002, 15 pages.

German Patent Publication No. DE 29915152 U1, Feb. 24, 2000, 17 pages.

Taiwanese Patent Publication No. TW 166970, Aug. 21, 1991, 03 pages.

Taiwanese Patent Publication No. TW 228760, Aug. 21, 1994, 03 pages.

Taiwanese Patent Publication No. TW 343578, Oct. 21, 1998, 04 pages.

Taiwanese Patent Publication No. TW 326734, Feb. 11, 1998, 05 pages.

Taiwanese Patent Publication No. TW 364424, Jul. 11, 1999, 04 pages.

Taiwanese Patent Publication No. TW 354003, Mar. 1, 1999, 04 pages.

Taiwanese Patent Publication No. TW 458024, Oct. 1, 2001, 04 pages.

Taiwanese Patent Publication No. TW 479599, Mar. 11, 2002, 03 pages.

Taiwanese Patent Publication No. TW 538861, Jun. 21, 2003, 06 pages.

Taiwanese Patent Publication No. TW 555627, Oct. 1, 2003, 07 pages.

Taiwanese Patent Publication No. TW I260248, Aug. 21, 2006, 04 pages.

Taiwanese Patent Publication No. TW 569870, Jan. 1, 2004, 06 pages.

Taiwanese Patent Publication No. TW M250763, Nov. 21, 2004, 10 pages.

Taiwanese Patent Publication No. TW M256794, Feb. 11, 2005, 05 pages.

Taiwanese Patent Publication No. TW M256264, Feb. 1, 2005, 05 pages.

Taiwanese Patent Publication No. TW M259675, Mar. 21, 2005, 06 pages.

Taiwanese Patent Publication No. TW I253376, Apr. 21, 2006, 10 pages.

Taiwanese Patent Publication No. TW M282790, Dec. 11, 2005, 07 pages.

Taiwanese Patent Publication No. TW M295563, Aug. 11, 2006, 05 pages.

Taiwanese Patent Publication No. TW M306161, Feb. 21, 2007, 07 pages.

Taiwanese Patent Publication No. TW M305735, Feb. 1, 2007, 05 pages.

Taiwanese Patent Publication No. TW M308147, Mar. 21, 2007, 11 pages.

* cited by examiner

CHUCK FOR BIT

BACKGROUND OF THE INVENTION

The present invention relates to a chuck for a bit and, more particularly, to a chuck for releasably receiving a bit such as a screwdriver bit.

Various chucks have been developed to allow quick change of a bit such as a screwdriver bit. A typical quick-change chuck includes a body having a first end coupled to a wrench or a screwdriver handle and a second end with a groove into which a shank of a bit is removably mounted. A sleeve is mounted around the body and movable along a longitudinal axis of the body between a coupling position in which a ball is engaged with the shank of the bit and, thus, retains the shank in place and a releasing position in which the ball is disengaged from the shank to allow removal or mounting of the bit. A spring is provided to bias the sleeve to the coupling position. An example of such a chuck is disclosed in U.S. Pat. No. 4,629,375. However, the chucks are usually utilized in an environment with oil such that the fingers of a user often slip and, thus, can not effectively move the sleeve to the releasing position, leading to problems during mounting or replacement of bits. Furthermore, it is well known that when using a tool to tighten or loosen a fastener such as a screw, rotating the screw in a loose state through operation of the tool is troublesome and inefficient.

Thus, a need exists for a chuck that allows easy removal of the bit and that allows rapid rotating of the chuck to rapidly rotate the fastener in a loose state.

BRIEF SUMMARY OF THE INVENTION

The present invention solves this need and other problems in the field of chucks for bits by providing, in a preferred form, a chuck including a body having first and second ends spaced along a longitudinal axis thereof. The second end of the body includes an engaging groove adapted for releasably receiving a bit. The second end further includes a coupling section. The first end of the body is adapted for releasably coupling with a tool such that rotational movement of the tool causes rotational movement of the bit. A sleeve is mounted around the body and movable relative to the body along the longitudinal axis between a coupling position and a releasing position. The sleeve includes a first compartment slidably receiving the second end of the body and a second compartment spaced from the first compartment along the longitudinal axis and slidably receiving the first end of the body. The sleeve further includes an engaging section coupled with the coupling section of the body to allow joint rotation of the sleeve and the body about the longitudinal axis when the sleeve is manually rotated while allowing movement of the sleeve relative to the body along the longitudinal axis between the coupling position and the releasing position. The sleeve further includes a flange on an outer periphery thereof. The flange is adapted to be gripped by a user for moving the sleeve from the coupling position to the releasing position. The flange is adapted for providing friction when the sleeve is manually rotated about the longitudinal axis by rotating the flange. A positioning member is mounted between the sleeve and the body and movable between an engaged position and a disengaged position. The positioning member is in the engaged position with the bit engaged with and retained by the positioning member in the engaging groove of the body when the sleeve is in the coupling position. The positioning member is movable between the engaged position and the disengaged position with the bit removable from the engaging groove of the body when the sleeve is in the releasing position. A spring is mounted between the body and the sleeve to bias the sleeve to the coupling position.

In a most preferred form, the flange is formed on an end of the outer periphery of the body and around the second compartment. The flange includes a frictional outer periphery adapted for providing friction when the sleeve is manually rotated about the longitudinal axis by rotating the frictional outer periphery of the flange. The sleeve further includes an annular protrusion formed on the other end of the outer periphery thereof and around the first compartment. The flange includes an end face facing the annular protrusion. The end face is adapted to be gripped by the user for moving the sleeve from the coupling position to the releasing position. The annular protrusion includes a frictional outer periphery adapted for providing friction when the sleeve is manually rotated about the longitudinal axis by manually rotating the frictional outer periphery of the annular protrusion.

In a most preferred form, the coupling section of the body includes two parallel, spaced chamfered faces formed on an outer periphery of the second end of the body and parallel to and spaced from the longitudinal axis. The engaging section of the sleeve includes two spaced extensions extending from an inner periphery of the first compartment of the sleeve and having two parallel, spaced flat faces parallel to and spaced from the longitudinal axis. The flat faces slideably abut the chamfered faces along the longitudinal axis. Furthermore, the flat faces are engaged with the chamfered faces to allow joint rotation of the sleeve and the body when the sleeve is manually rotated about the longitudinal axis.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
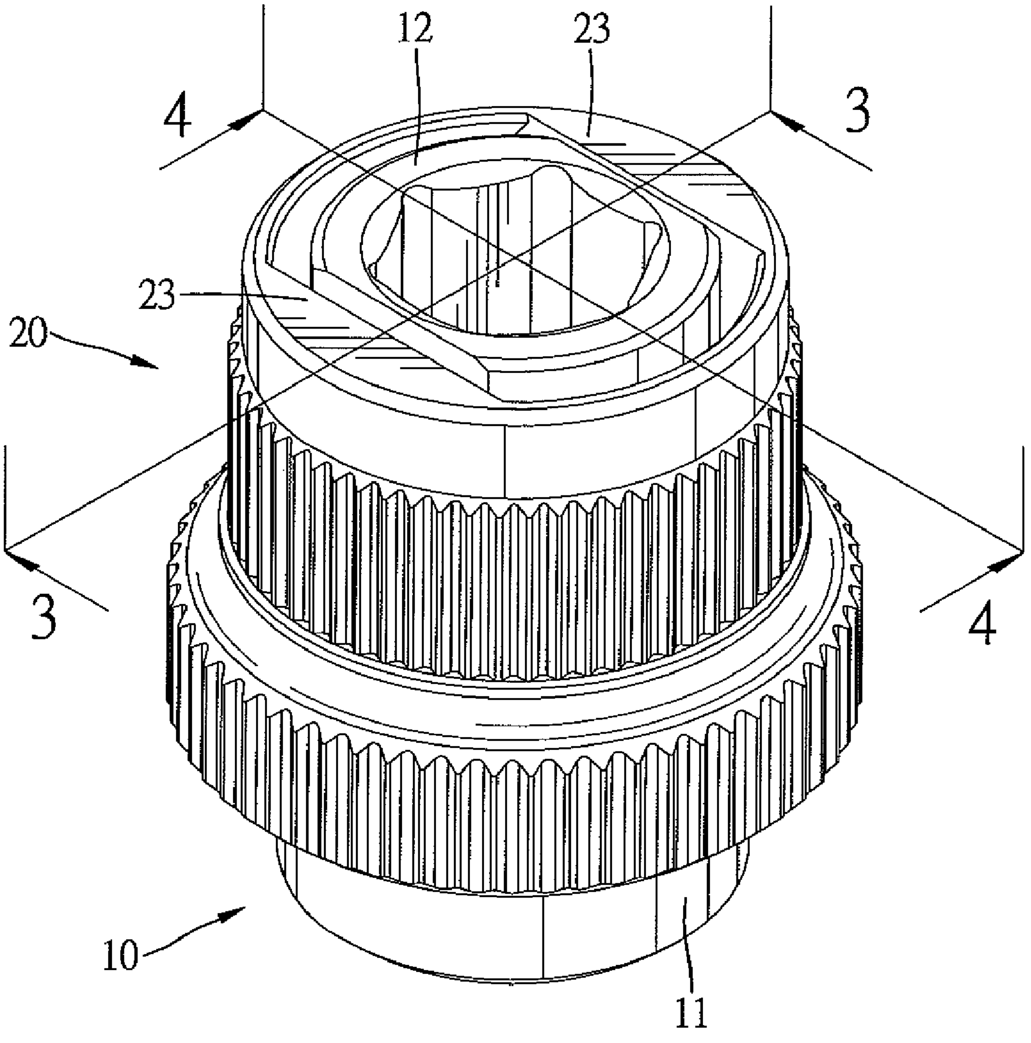
FIG. 1 shows a diagrammatic perspective view of a chuck for a bit of a first embodiment according to the preferred teachings of the present invention.
Figure 2:
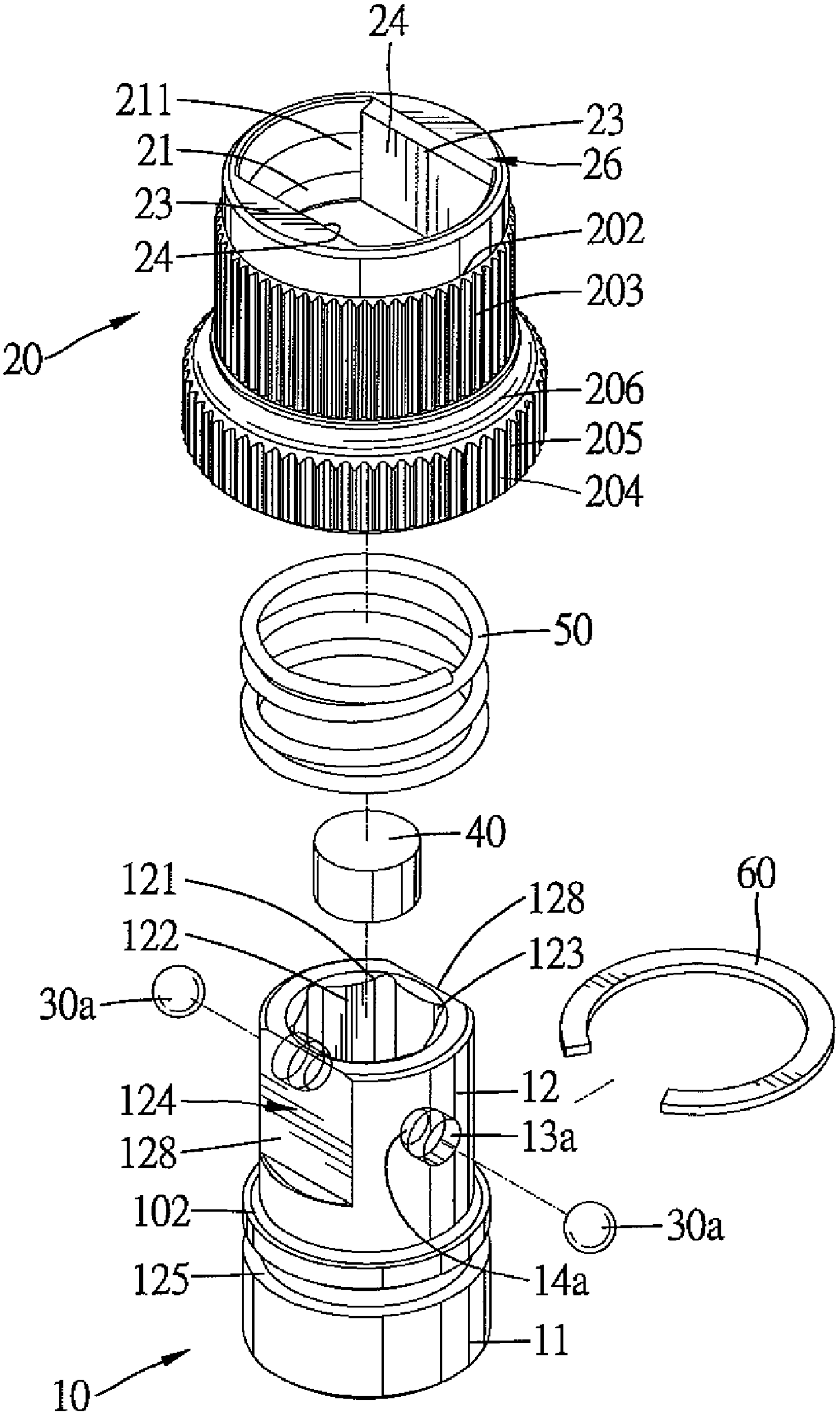
FIG. 2 shows an exploded, perspective view of the chuck of FIG. 1.
Figure 3:
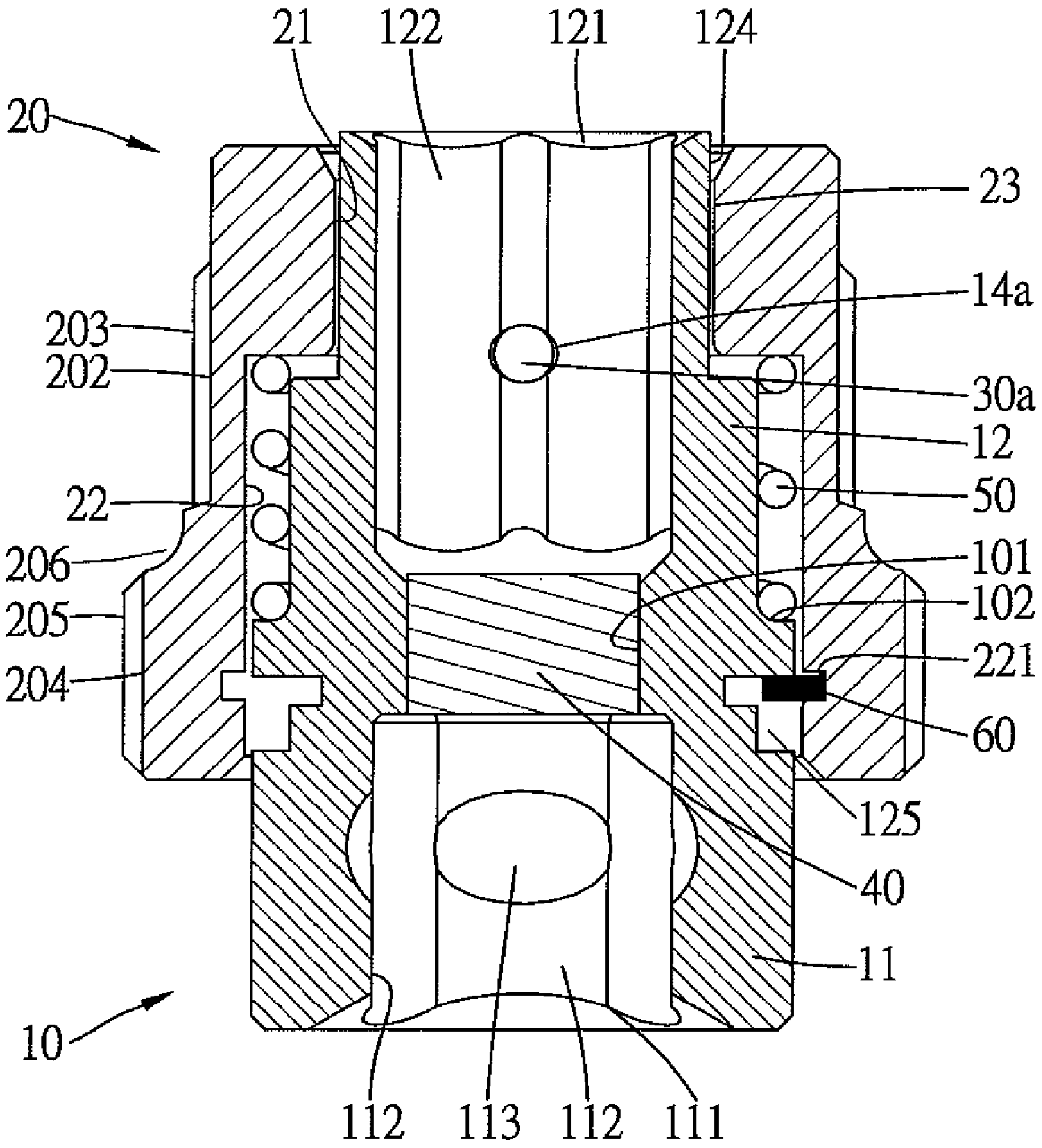
FIG. 3 shows a cross sectional view of the chuck of FIG. 1 according to section line 3-3 of FIG. 1.
Figure 4:
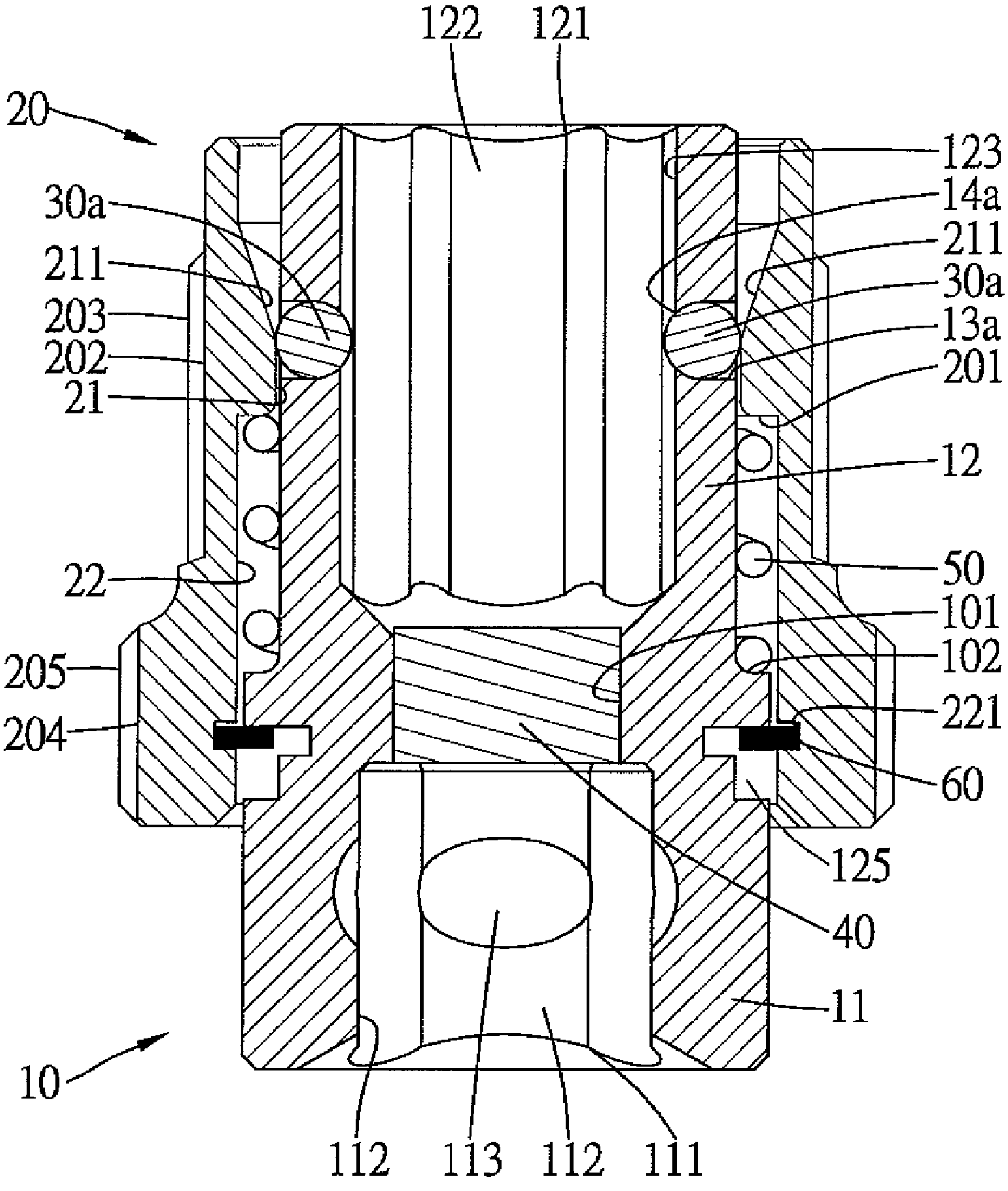
FIG. 4 shows a cross sectional view of the chuck of FIG. 1 according to section line 4-4 of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “inner”, “outer”, “end”, “portion”, “section”, “longitudinal”, “radial”, “circumferential”, “annular”, “outward”, “inward”, “length”, and similar terms are used herein, it should be understood that these terms have reference only to the structure shown in the drawings as it would appear to a person viewing the drawings and are utilized only to facilitate describing the invention.

DETAILED DESCRIPTION OF THIS INVENTION

A chuck for a bit of an embodiment according to the preferred teachings of the present invention is shown in FIGS. 1-6 of the drawings. According to the preferred form shown, the chuck includes a body 10 having first and second ends 11 and 12 spaced along a longitudinal axis of body 10. Body 10 includes a longitudinal through-hole extending along the longitudinal axis and in the preferred form shown as having a coupling groove 111 and an engaging groove 121 respectively in first and second ends 11 and 12 of body 10 and an intermediate section 101 between coupling groove 111 and engaging groove 121. Coupling groove 111 releasably couples with a tool 90 in the preferred form shown as a socket wrench including a drive column 91 having a ball 92. According to the most preferred form shown, coupling groove 111 is square in cross section and includes four faces 112 each having a recess 113 for releasably engaging with ball 92 of drive column 91. It can be appreciated that drive column 91 can be of any desired form and size as conventional including but not limited to of a commercially available type and that coupling groove 111 can be modified to correspond to the size and form of drive column 91. As an example, coupling groove 111 can be hexagonal in cross section and have six faces to couple with a drive column having hexagonal cross sections. Engaging groove 121 is polygonal in cross section and, in the most preferred form, is hexagonal and includes six faces 122 at 120 degrees to one another with a corner 123 formed between two faces 122 adjacent to each other. Engaging groove 121 releasably receives a shank 82 of a bit 80 having six sides and a groove 81 in the preferred form shown as a plurality of groove sections on an outer periphery of bit 80. Rotational movement of tool 90 causes rotational movement of bit 80. A magnet 40 is mounted in intermediate section 101 for attracting and retaining bit 80 in engaging groove 121. According to the preferred form shown, second end 12 of body 10 further includes a coupling section 124 in the most preferred form shown as diametrically opposed, parallel, first and second chamfered faces 128 formed on an outer periphery of second end 12 of body 10 and parallel to and spaced from the longitudinal axis. Second end 12 of body 10 further includes first and second holes 13*a* each extending radially inward from the outer periphery in a radial direction perpendicular to the longitudinal axis and each having a reduced, inner end 14*a* extending through one of corners 123 and in communication with engaging groove 121. Each of first and second holes 13*a* is intermediate first and second chamfered faces 128. Body 10 further includes a shoulder 102 formed on an intermediate portion of the outer periphery thereof and spaced from coupling section 124 along the longitudinal axis. Furthermore, first end 11 of body 10 includes an annular groove 125 formed in the outer periphery thereof and having first and second ends spaced in a direction parallel to the longitudinal axis. Shoulder 102 is intermediate coupling section 124 and annular groove 125.

According to the preferred form shown, the chuck further includes a sleeve 20 mounted around and movable relative to body 10 along the longitudinal axis between a coupling position and a releasing position. Sleeve 20 includes a first compartment 21 slideably receiving second end 12 of body 10 and a second compartment 22 spaced from first compartment 21 along the longitudinal axis and slideably receiving first end 11 of body 10. Sleeve 20 further includes an engaging section 26 coupled with coupling section 124 of the body 10 to allow joint rotation of sleeve 20 and body 10 about the longitudinal axis when sleeve 20 is manually rotated while allowing movement of sleeve 20 relative to body 10 along the longitudinal axis between the coupling position and the releasing position. According to the most preferred form shown, engaging section 26 of sleeve 20 includes spaced first and second extensions 23 extending from an inner periphery of first compartment 21 of sleeve 20. First extension 23 includes a first flat face 24 parallel to and spaced from the longitudinal axis. Second extension 23 includes a second flat face 24 parallel to and spaced from the longitudinal axis and parallel to and spaced from first flat face 24 of first extension 23. First and second flat faces 24 slideably abut first and second chamfered faces 128 along the longitudinal axis allowing sliding movement of sleeve 20 relative to body 10. However, flat faces 24 are engaged with first and second chamfered faces 128 to allow joint rotation of sleeve 20 and body 10 when sleeve 20 is manually rotated about the longitudinal axis. First compartment 21 further includes a first conic section 211 intermediate first and second extensions 23. First compartment 21 further includes a second conic section 211 opposite to and spaced from first conic section 211 and intermediate first and second extensions 23. Each of first and second conic sections 211 has increasing radii to the longitudinal axis away from second compartment 22.

According to the preferred form shown, sleeve 20 further includes a flange 204 formed on an end of an outer periphery thereof and around second compartment 22. Flange 204 has an end face 206 that can be gripped by a user for moving sleeve 20 from the coupling position to the releasing position. Flange 204 includes a frictional outer periphery 205 in the most preferred form shown as a plurality of annularly spaced ribs. Frictional outer periphery 205 provides friction when sleeve 20 is manually rotated about the longitudinal axis by manually rotating frictional outer periphery 205. Sleeve 20 further includes an annular protrusion 202 formed on the other end of the outer periphery thereof and around first compartment 21. Annular protrusion 202 includes a frictional outer periphery 203 in the most preferred form shown as a plurality of annularly spaced ribs. Frictional outer periphery 203 provides friction when sleeve 20 is manually rotated about the longitudinal axis by manually rotating frictional outer periphery 203. Sleeve 20 further includes a shoulder 201 on an inner periphery thereof between first and second compartments 21 and 22. A spring 50 is mounted around body 10 between shoulders 102 and 201 with shoulder 102 intermediate spring 50 and annular groove 125. Spring 50 biases sleeve 20 to the coupling position. Sleeve 20 further includes an annular groove 221 in an inner periphery of second compartment 22. A retainer ring 60 is partially received in annular groove 221 of sleeve 20 and partially received in annular groove 125 of body 10. Retainer 60 prevents sleeve 20 from disengaging from body 10. Furthermore, retainer 60 slides between the first and second ends of annular groove 125 in the direction parallel to the longitudinal axis when sleeve 20 moves between the coupling position and the releasing position relative to body 10.

According to the preferred form shown, the chuck further includes two positioning members 30*a* in the most preferred form shown as two balls slidably received in first and second holes 13*a*. Each positioning member 30*a* is movable between an engaged position and a disengaged position and has a diameter smaller than that of holes 13*a* and larger than that of the reduced, inner ends 14*a* of first and second holes 13*a*.

Figure 5:
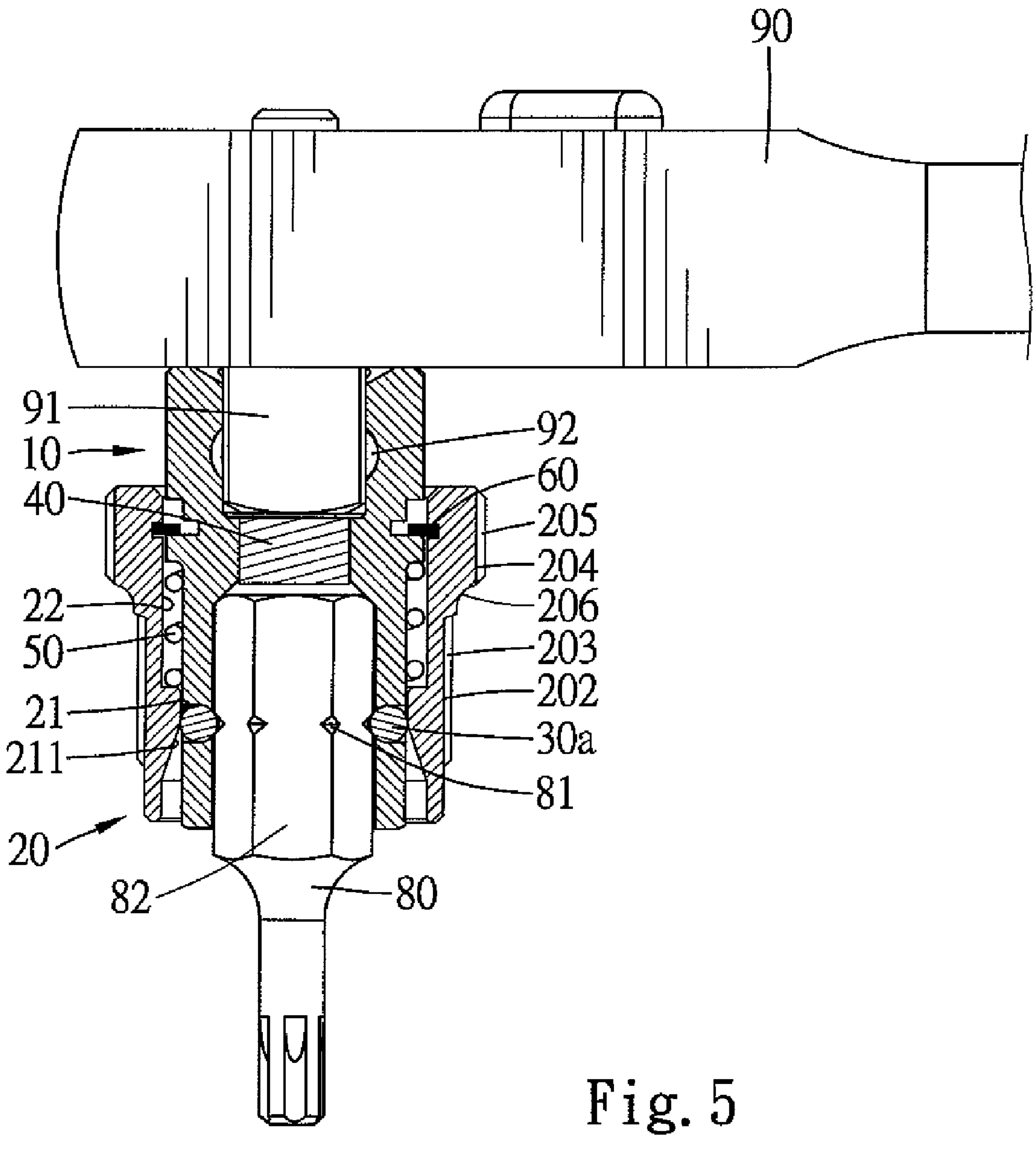
FIG. 5 shows a cross sectional view of the chuck of FIG. 1 with a tool and a bit coupled to the chuck.

Now that the basic construction of the chuck of the preferred teachings of the present invention has been explained, the operation and some of the advantages of the chuck can be set forth and appreciated. In particular, for the sake of explanation, it will be assumed that coupling groove 111 of body 10 is engaged with drive column 91 of tool 90 and that shank 82 of bit 80 is engaged in engaging groove 121 of body 10 with sleeve 20 in the coupling position (FIG. 5). Note that each positioning member 30*a* is in the engaged position when sleeve 20 is in the coupling position. Specifically, each positioning member 30*a* is in contact with and pressed by an inner periphery of first compartment 21 of sleeve 20. As a result, each positioning member 30*a* is partially extended into one of corners 123 and engaged with groove 81 of bit 80, retaining bit 80 in engaging groove 121. Bit 80 is rotated when tool 90 is rotated for tightening or loosening a fastener such as a nut, bolt, etc. In a case that the fastener to be loosened or tightened is in a loose state, the user can use one of his or her thumbs to turn annular protrusion 202 and/or flange 204 by frictional outer periphery 203 and/or frictional outer periphery 205 to rapidly rotate bit 80 in the loosening or tightening direction. Since first and second flat faces 24 are engaged with first and second chamfered faces 128, sleeve 20 and body 10 rotate jointly when sleeve 20 is manually rotated about the longitudinal axis. Note that the distance between sleeve 20 and tool 90 is small, for the overall length of the chuck is small. Thus, the user can rapidly rotate sleeve 20 and body 10 to rapidly rotate the fastener. Accordingly, troublesome, inefficient operation of tool 90 for rotating the loose fastener is not required.

Figure 6:
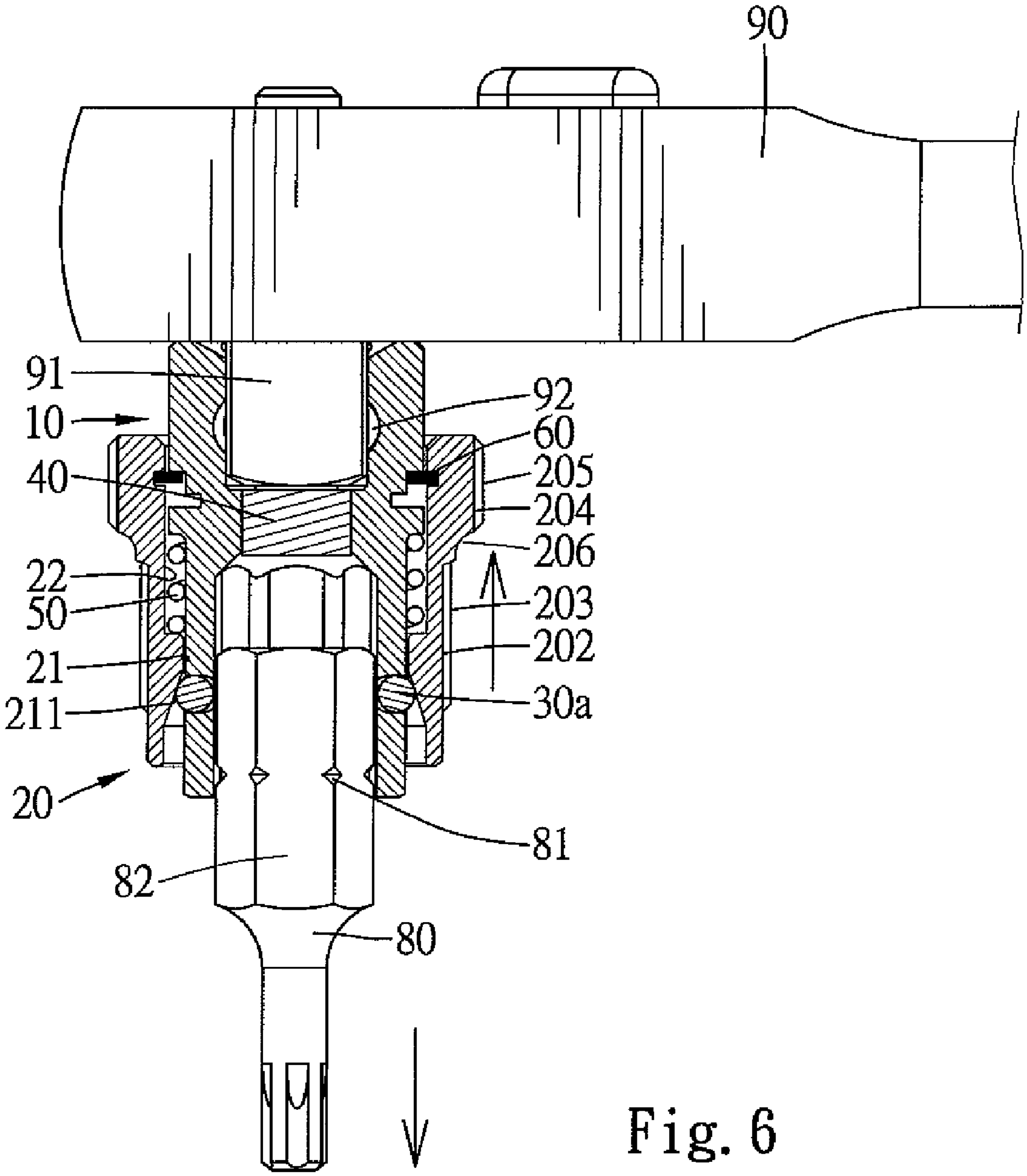
FIG. 6 shows a cross sectional view of the chuck of FIG. 1 with a tool and a bit coupled to the chuck and with a sleeve of the chuck moved to a releasing position allowing removal of the bit.

When it is desired to remove bit 80 from the chuck, the user holds flange 204 of sleeve 20 with the thumb and index finger of one hand and moves sleeve 20 along the longitudinal axis of body 10 toward coupling groove 111 to the releasing position and overcomes spring 50 (FIG. 6). Flat faces 24 slide across first and second chamfered faces 128 along the longitudinal axis when sleeve 20 is moved from the coupling position to the releasing position. At the same time, retainer ring 60 slides from the first end (corresponding to the coupling position of sleeve 20) of annular groove 125 to the second end (corresponding to the releasing position of sleeve 20) of annular groove 125 in the direction parallel to the longitudinal axis. Note that the other three fingers of the hand moving sleeve 20 can still hold tool 90 while moving sleeve 20 from the coupling position to the releasing position. Note that bit 80 is still retained in engaging groove 121 by magnet 40. The user can remove bit 80 from engaging groove 121 with the other hand. Each positioning member 30*a* is moved radially outward from the engaged position to the disengaged position outside of corner 123 and, thus, disengaged from groove 81 of bit 80. Thus, troublesome removal of the bit encountered in conventional chucks is avoided. It can be appreciated that the chuck according to the preferred teachings of the present invention provides synergistic results when utilized with a socket wrench. When coupling of bit 80 into engaging groove 121 is required, the user moves sleeve 20 to the releasing position and inserts shank 82 of bit 80 into engaging groove 121. Sleeve 20, when released by the user, is moved to the coupling position under the action of spring 50, and bit 80 is retained in engaging groove 121 by positioning members 30*a* and magnet 40.

Figure 7:
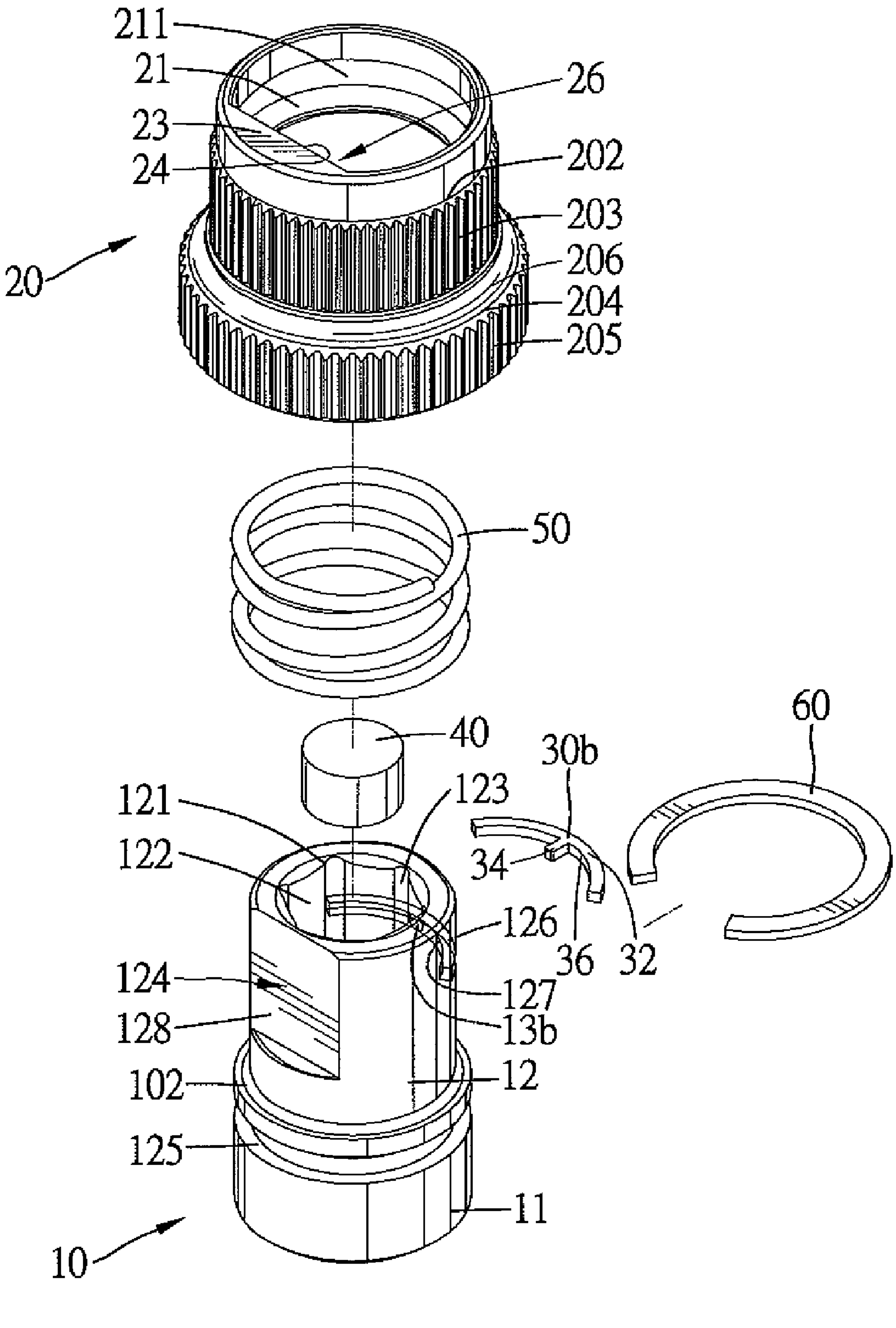
FIG. 7 shows an exploded, perspective view of a chuck of a modified embodiment according to the preferred teachings of the present invention.
Figure 8:
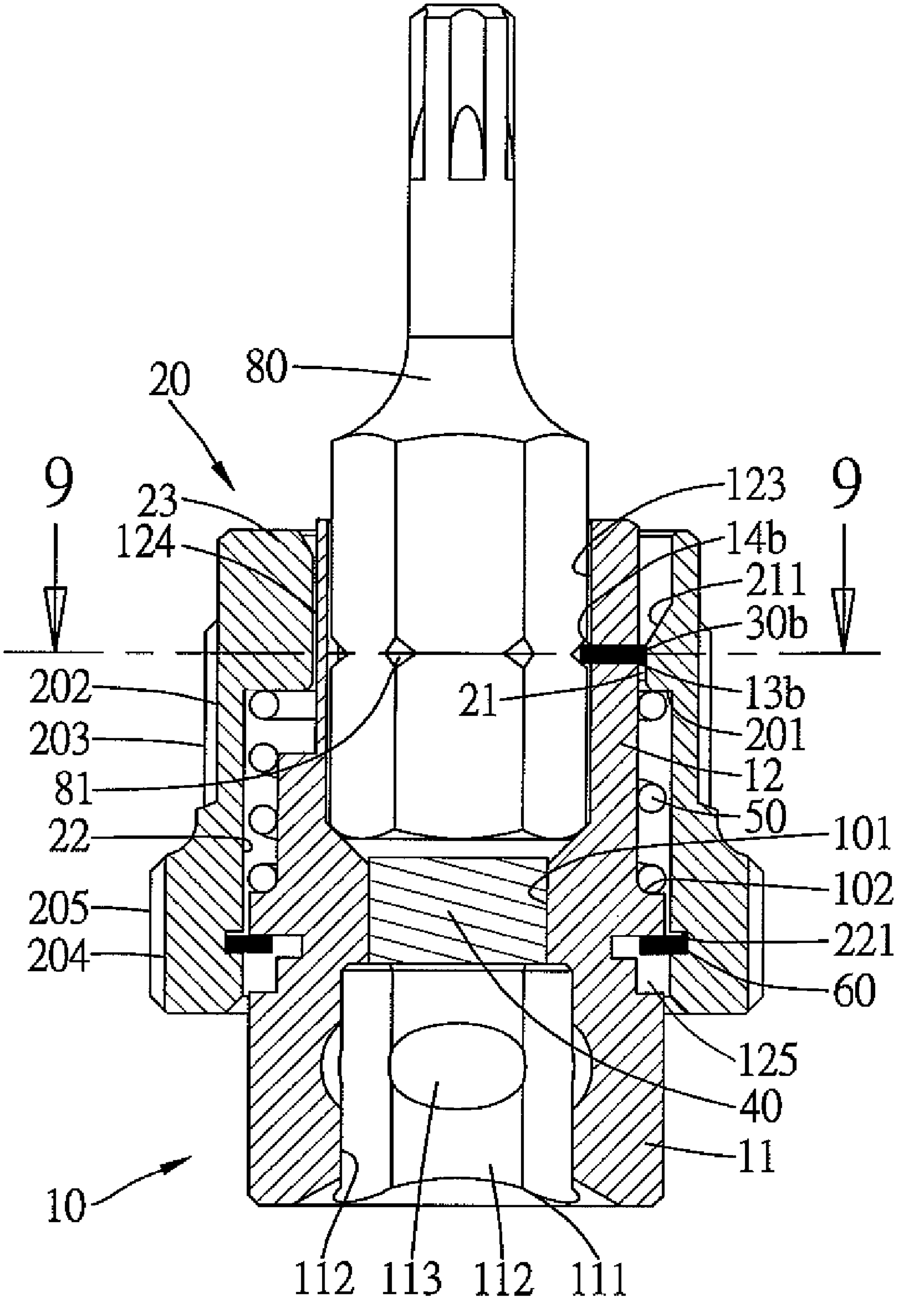
FIG. 8 shows a cross sectional view of the chuck of FIG. 7 with a bit coupled to the chuck.
Figure 9:
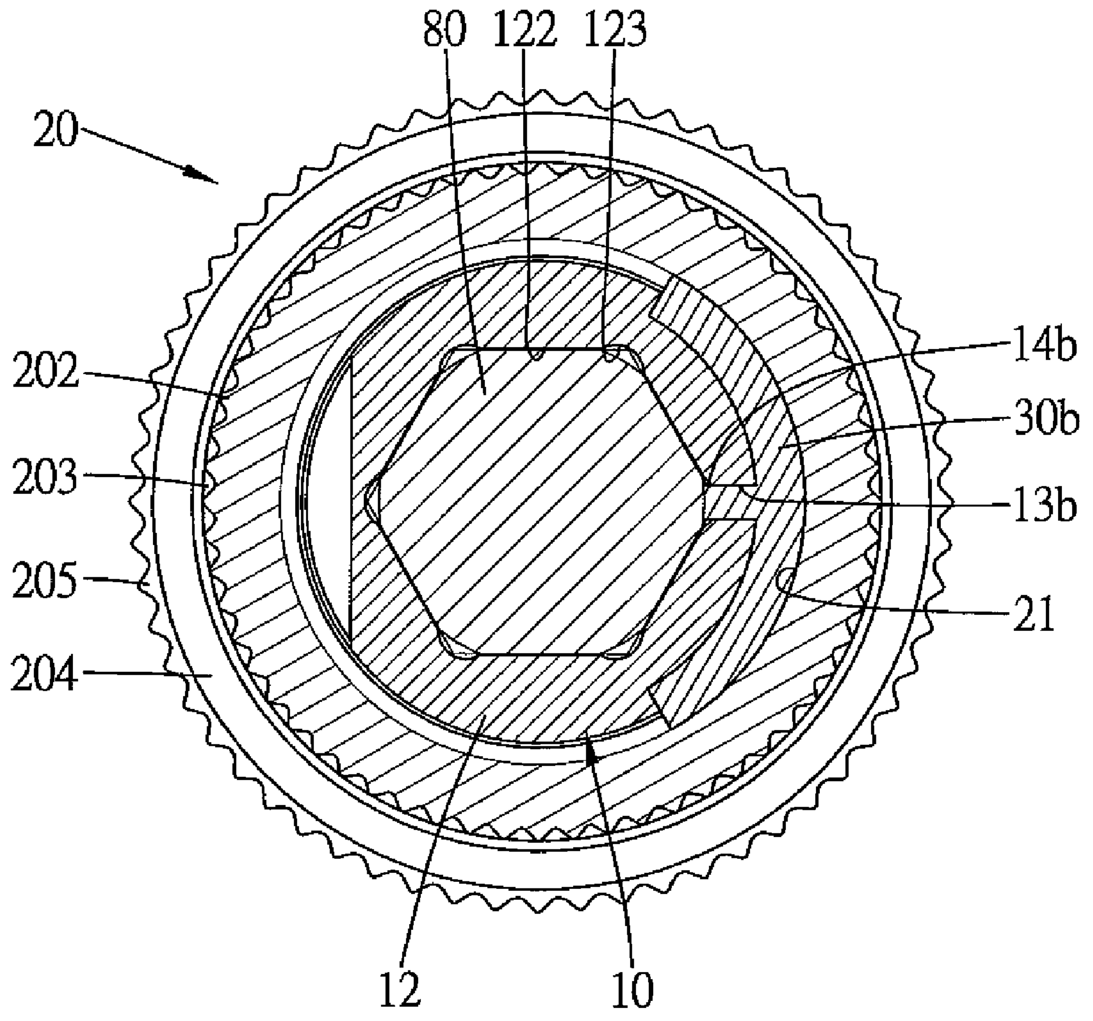
FIG. 9 shows a cross sectional view of the chuck of FIG. 7 according to section line 9-9 of FIG. 8.

In a modified embodiment of the chuck according to the preferred teachings of the present invention shown in FIGS. 7-9, coupling section 124 of body 10 includes only one chamfered face 128, and engaging section 26 of sleeve 20 includes only one extension 23. Furthermore, first and second holes 13*a* are replaced with an arcuate groove 126 in the outer periphery of second end 12 of body 10. Specifically, arcuate groove 126 extends in a circumferential direction around the longitudinal axis and has a bottom wall 127. Second end 12 of body 10 includes a hole 13*b* extending in a radial direction perpendicular to the longitudinal axis and orthogonal to the circumferential direction from bottom wall 127 of arcuate groove 126 toward engaging groove 121. Hole 13*b* has an inner end 14*b* extending into one of corners 123 and in communication with engaging groove 121. According to the preferred form shown, a positioning member 30*b* having E-shaped cross sections is provided. Specifically, positioning member 30*b* includes an arcuate section 32 slidably received in arcuate groove 126 and a projection 34 extending from an inner face 36 of arcuate section 32 and slidably received in hole 13*b*. Projection 34 is extended through hole 13*b* into engaging groove 121 and engaged with groove 81 of bit 80 when positioning member 30*b* is in the engaged position. On the other hand, positioning member 30*b* is movable from the engaged position to the disengaged position by removing bit 80 from engaging groove 121 when sleeve 20 is in the releasing position. Operation of the chuck of FIGS. 7-9 is substantially the same as that of the chuck of FIGS. 1-6.

Figure 10:
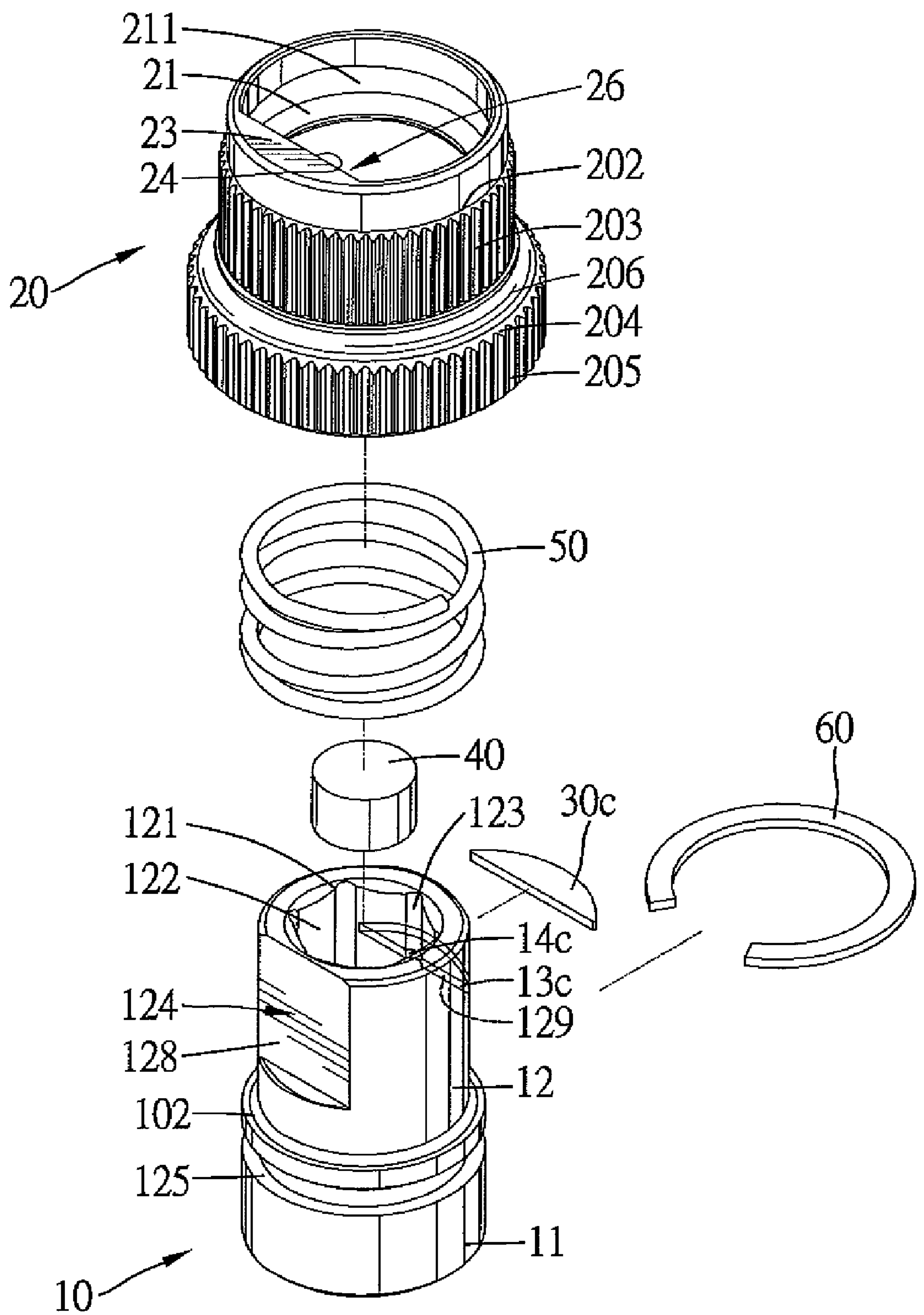
FIG. 10 shows an exploded, perspective view of a chuck of another modified embodiment according to the preferred teachings of the present invention.
Figure 11:
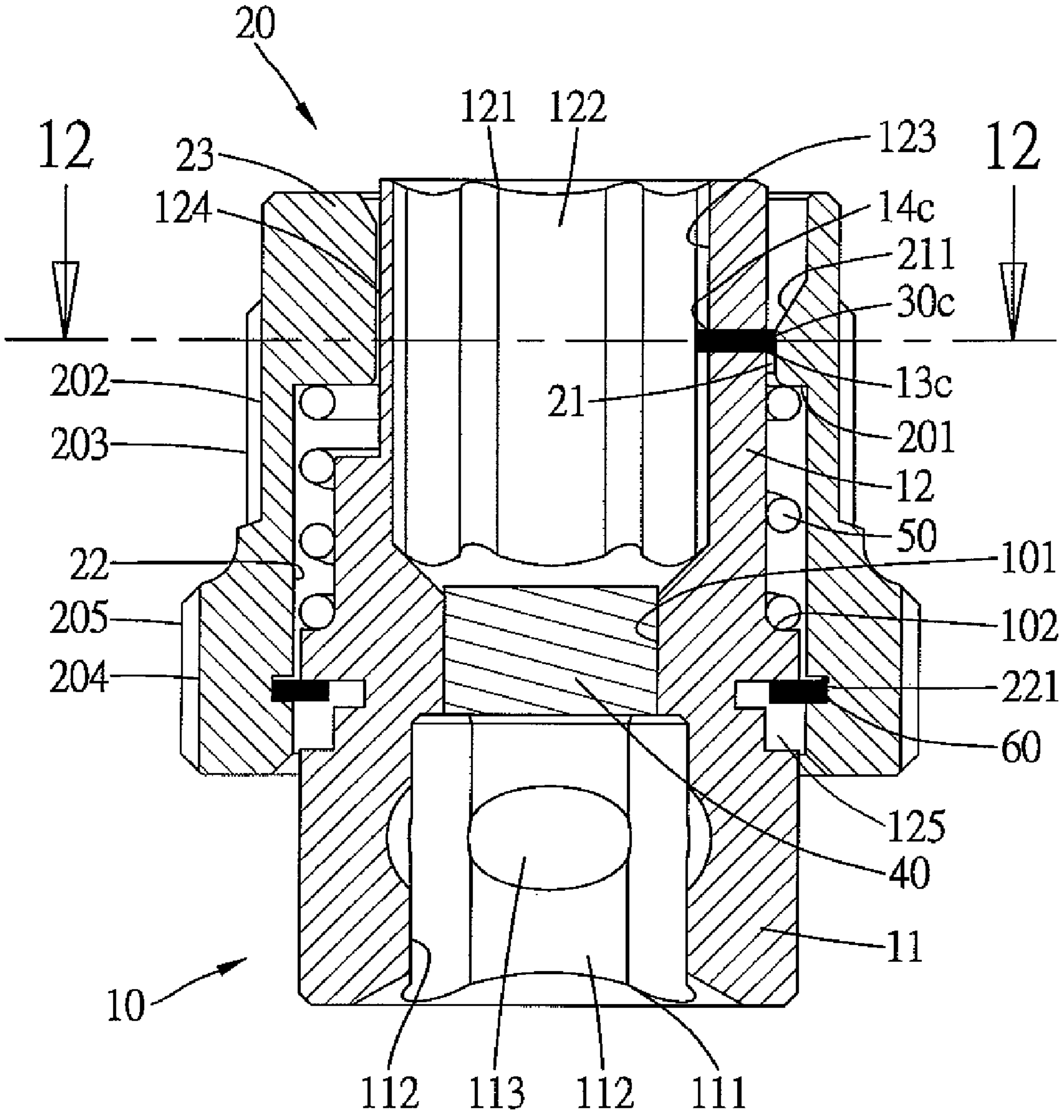
FIG. 11 shows a cross sectional view of the chuck of FIG. 10.
Figure 12:
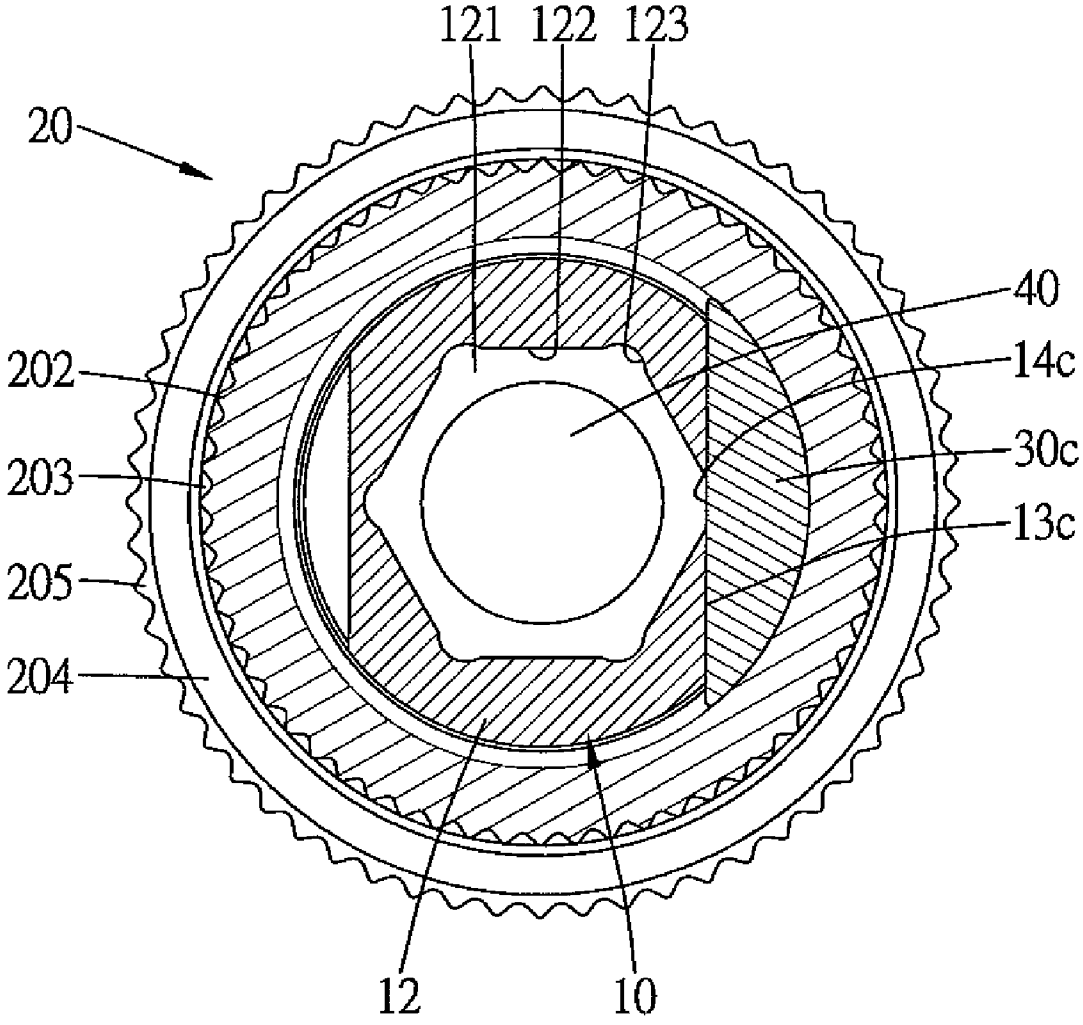
FIG. 12 shows a cross sectional view of the chuck of FIG. 10 according to section line 12-12 of FIG. 11.

In another modified embodiment of the chuck according to the preferred teachings of the present invention shown in FIGS. 10-12, coupling section 124 of body 10 includes only one chamfered face 128, and engaging section 26 of sleeve 20 includes only one extension 23. Furthermore, first and second holes 13*a* are replaced with a crescent groove 13*c* in the outer periphery of second end 12 of body 10. Crescent groove 13*c* has a bottom wall 129 and an opening 14*c* extending through bottom wall 129 into one of the corners 123 and in communication with engaging groove 121. According to the preferred form shown, a positioning member 30*c* having crescent cross sections is provided. Positioning member 30*c* is slidably received in crescent groove 13*c*. Furthermore, positioning member 30*c* has a portion extending through opening 14*c* into engaging groove 121 and engaged in groove 81 of bit 80 when in the engaged position. On the other hand, positioning member 30*c* is movable from the engaged position to the disengaged position by removing bit 80 from engaging groove 121 when sleeve 20 is in the releasing position. Operation of the chuck of FIGS. 10-12 is substantially the same as that of the chuck of FIGS. 1-6.

Now that the basic teachings of the present invention have been explained, many extensions and variations will be obvious to one having ordinary skill in the art. For example, tool 90 can be in the form of a simple screwdriver handle having a drive column or shank for releasably coupling with coupling groove 111 of body 10 of the chuck according to the preferred teachings of the present invention. Holes 13*a* and 13*b*, grooves 126 and 13*c*, and positioning members 30*a*, 30*b*, and 30*c* of the chuck according to the preferred teachings of the present invention can have other forms and shapes while providing the same positioning effects. Frictional outer peripheries 203 and 205 of sleeve 20 of the chuck according to the preferred teachings of the present invention can be in other forms such as a knurled structure or such as having regular or irregular embossed patterns. Magnet 40 can be omitted if desired. Coupling groove 111 and engaging groove 121 of body 10 of the chuck according to the preferred teachings of the present invention can be spaced from each other by a solid wall. The shape and size of engaging groove 121 can be varied according to those of bit 80 to be coupled with the chuck according to the preferred teachings of the present invention. One of chamfered faces 128 of coupling section 124 of body 10, one of extensions 23 of engaging section 26 of sleeve 20, one of first and second holes 13*a*, and one of positioning members 30*a* in the chuck of FIGS. 1-6 can be omitted if desired.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A chuck for a bit comprising:

a body including a first end and a second end spaced from the first end along a longitudinal axis of the body, with the second end of the body including an engaging groove adapted for releasably receiving the bit, with the second end further including a coupling section having a first chamfered flat face parallel to and spaced from the longitudinal axis, with the first end of the body being adapted for releasably coupling with a tool such that rotational movement of the tool causes rotational movement of the bit;

a sleeve mounted around the body and movable relative to the body along the longitudinal axis between a coupling position and a releasing position, with the sleeve including a first compartment slideably receiving the second end of the body and a second compartment spaced from the first compartment along the longitudinal axis and slideably receiving the first end of the body, with the sleeve further including an engaging section having a first flat surface parallel to and spaced from the longitudinal axis and coupled with the first chamfered flat face of the coupling section of the body, wherein the sleeve and the body jointly rotate about the longitudinal axis when the sleeve is manually rotated while allowing movement of the sleeve relative to the body along the longitudinal axis between the coupling position and the releasing position, with the sleeve further including a flange on an outer periphery thereof, with the flange adapted to be gripped by a user for moving the sleeve from the coupling position to the releasing position, with the flange adapted for providing friction when the sleeve is manually rotated about the longitudinal axis by rotating the flange;

a positioning member mounted between the sleeve and the body and movable between an engaged position and a disengaged position, with the positioning member being in the engaged position with the bit engaged with and retained by the positioning member in the engaging groove of the body when the sleeve is in the coupling position, with the positioning member movable between the engaged position and the disengaged position with the bit removable from the engaging groove of the body when the sleeve is in the releasing position; and a spring mounted between the body and the sleeve, with the spring biasing the sleeve to the coupling position.

2. The chuck for the bit as claimed in claim 1, with the coupling section including the first chamfered flat face on an outer periphery of the second end of the body and parallel to and spaced from the longitudinal axis, with the engaging section of the sleeve including a first extension extending from an inner periphery of the first compartment of the sleeve, with the first extension including the first flat face parallel to and spaced from the longitudinal axis, with the first flat face slideably abutting the first chamfered flat face along the longitudinal axis, and with the first flat face being engaged with the first chamfered flat face to allow joint rotation of the sleeve and the body when the sleeve is manually rotated about the longitudinal axis.

3. The chuck for the bit as claimed in claim 2, with the coupling section further including a second chamfered flat face on the outer periphery of the second end of the body, with the second chamfered flat face being parallel to and spaced from the longitudinal axis and parallel to and spaced from the first chamfered flat face, with the engaging section of the sleeve further including a second extension extending from the inner periphery of the first compartment of the sleeve, with the second extension including a second flat face parallel to and spaced from the longitudinal axis and parallel to and spaced from the first flat face, with the second flat face slideably abutting the second chamfered flat face along the longitudinal axis, and with the second flat face being engaged with the second chamfered flat face to allow joint rotation of the sleeve and the body when the sleeve is manually rotated about the longitudinal axis.

4. The chuck for the bit as claimed in claim 3, with the engaging groove of the body including a plurality of faces for receiving a plurality of sides of the bit, with a corner formed between two of the plurality of faces adjacent to each other, with the second end of the body further including a first hole extending from the outer periphery in a radial direction perpendicular to the longitudinal axis and including a first reduced, inner end extending through one of the corners and in communication with the engaging groove, with the first hole intermediate the first and second chamfered flat faces, with the positioning member including a first ball slideably received in the first hole and movable between the engaged position and the disengaged position, with the first ball having a diameter smaller than that of the first hole and larger than that of the first reduced, inner end of the first hole, with the first ball partially extended into one of the corners and engaged with the bit in the engaged position, and with the first ball disengaged from the bit in the disengaged position.

5. The chuck for the bit as claimed in claim 4, with the second end of the body further including a second hole extending in the radial direction from the outer periphery and including a second reduced, inner end extending through another of the corners and in communication with the engaging groove, with the second hole intermediate the first and second chamfered flat faces and diametrically opposed to the first hole, with the chuck further comprising, in combination:

a second ball slideably received in the second hole and movable between an engaged position and a disengaged position, with the second ball having a diameter smaller than that of the second hole and larger than that of the reduced, inner end of the second hole, with the second ball partially extended into one of the corners and engaged with the bit in the engaged position, with the second ball disengaged from the bit in the disengaged position, with the second ball member being in the engaged position with the bit engaged with and retained by the second ball in the engaging groove of the body when the sleeve is in the coupling position, with the second ball movable between the engaged position and the disengaged position with the bit removable from the engaging groove of the body when the sleeve is in the releasing position.

6. The chuck for the bit as claimed in claim 5, with the first compartment including a first conic section intermediate the first and second extensions, with the first compartment further including a second conic section opposite to and spaced from the first conic section and intermediate the first and second extensions, with each of the first and second conic sections having increasing radii to the longitudinal axis away from the second compartment, with the first and second balls movable across the first and second conic sections from the engaged position to the disengaged position by removing the bit from the engaging groove when the sleeve is in the releasing position.

7. The chuck for the bit as claimed in claim 6, with the first end of the body including a first annular groove in an outer periphery thereof, with the first annular groove having first and second ends spaced in a direction parallel to the longitudinal axis and corresponding to the coupling position and the releasing position of the sleeve, with the second compartment of the sleeve including a second annular groove in an inner periphery thereof, with the chuck further comprising, in combination: a retainer ring partially received in the first annular groove and partially received in the second annular groove, with the retainer ring sliding between the first and second ends of the first annular groove in the direction parallel to the longitudinal axis when the sleeve moves between the coupling position and the releasing position relative to the body.

8. The chuck for the bit as claimed in claim 7, with the outer periphery of the body further including a first shoulder formed thereon, with the sleeve further including a second shoulder on an inner periphery thereof between the first and second compartments, with the spring mounted around the body between the first and second shoulders and biasing the sleeve to the coupling position, and with the first shoulder intermediate the spring and the first annular groove.

9. The chuck for the bit as claimed in claim 2, with the engaging groove of the body including a plurality of faces for receiving a plurality of sides of the bit, with a corner formed between two of the plurality of faces adjacent to each other, with the second end of the body further including a hole extending from the outer periphery in a radial direction perpendicular to the longitudinal axis and including a reduced, inner end extending through one of the corners and in communication with the engaging groove, with the positioning member including a ball slideably received in the hole and movable between the engaged position and the disengaged position, with the ball having a diameter smaller than that of the hole and larger than that of the reduced, inner end of the hole, with the ball partially extended into one of the corners and engaged with the bit in the engaged position, and with the ball disengaged from the corner in the disengaged position.

10. The chuck for the bit as claimed in claim 2, with the engaging groove of the body including a plurality of faces for coupling a plurality of faces of the bit, with a corner formed between two of the plurality of faces adjacent to each other, with the outer periphery of the second end of the body further including an arcuate groove extending in a circumferential direction around the longitudinal axis, with the arcuate groove having a bottom wall, with the second end of the body further including a hole extending in a radial direction perpendicular to the longitudinal axis and orthogonal to the circumferential direction, with the hole extending from the bottom wall of the arcuate groove into one of the corners and in communication with the engaging groove, with the positioning member including an arcuate section slideably received in the arcuate groove, with the positioning member further including a projection extending from the arcuate section and slideably received in the hole, with the projection extended through the hole into the engaging groove and engaged with the bit when the positioning member is in the engaged position, with the positioning member movable from the engaged position to the disengaged position by removing the bit from the engaging groove when the sleeve is in the releasing position.

11. The chuck for the bit as claimed in claim 10, with the first end of the body including a first annular groove in an outer periphery thereof, with the first annular groove having first and second ends spaced in a direction parallel to the longitudinal axis and corresponding to the coupling position and the releasing position of the sleeve, with the second compartment of the sleeve including a second annular groove in an inner periphery thereof, with the chuck further comprising, in combination: a retainer ring partially received in the first annular groove and partially received in the second annular groove, with the retainer ring sliding between the first and second ends of the first annular groove in the direction parallel to the longitudinal axis when the sleeve moves between the coupling position and the releasing position relative to the body.

12. The chuck for the bit as claimed in claim 11, with the outer periphery of the body further including a first shoulder formed thereon, with the sleeve further including a second shoulder on an inner periphery thereof between the first and second compartments, with the spring mounted around the body between the first and second shoulders and biasing the sleeve to the coupling position, and with the first shoulder intermediate the spring and the first annular groove.

13. The chuck for the bit as claimed in claim 2, with the engaging groove of the body including a plurality of faces for coupling a plurality of sides of the bit, with a corner formed between two of the plurality of faces adjacent to each other, with-the second end of the body further including a groove in the outer periphery thereof and having a bottom wall, with the groove having an opening extending through the bottom wall into one of the corners and in communication with the engaging groove, with the positioning member slideably received in the groove, with the positioning member having a portion extending through the opening into the engaging groove and engaged with the bit when in the engaged position, and with the positioning member movable from the engaged position to the disengaged position by removing the bit from the engaging groove when the sleeve is in the releasing position.

14. The chuck for the bit as claimed in claim 13, with the first end of the body including a first annular groove in an outer periphery thereof, with the first annular groove having first and second ends spaced in a direction parallel to the longitudinal axis and corresponding to the coupling position and the releasing position of the sleeve, with the second compartment of the sleeve including a second annular groove in an inner periphery thereof, with the chuck further comprising, in combination: a retainer ring partially received in the first annular groove and partially received in the second annular groove, with the retainer ring sliding between the first and second ends of the first annular groove in the direction parallel to the longitudinal axis when the sleeve moves between the coupling position and the releasing position relative to the body.

15. The chuck for the bit as claimed in claim 14, with the outer periphery of the body further including a first shoulder formed thereon, with the sleeve further including a second shoulder on an inner periphery thereof between the first and second compartments, with the spring mounted around the body between the first and second shoulders and biasing the sleeve to the coupling position, and with the first shoulder intermediate the spring and the first annular groove.

16. The chuck for the bit as claimed in claim 1, with the first end of the body including a first annular groove in an outer periphery thereof, with the first annular groove having first and second ends spaced in a direction parallel to the longitudinal axis and corresponding to the coupling position and the releasing position of the sleeve, with the second compartment of the sleeve including a second annular groove in an inner periphery thereof, with the chuck further comprising, in combination: a retainer ring partially received in the first annular groove and partially received in the second annular groove, with the retainer ring sliding between the first and second ends of the first annular groove in the direction parallel to the longitudinal axis when the sleeve moves between the coupling position and the releasing position relative to the body.

17. The chuck for the bit as claimed in claim 16, with the outer periphery of the body further including a first shoulder formed thereon, with the sleeve further including a second shoulder on an inner periphery thereof between the first and second compartments, with the spring mounted around the body between the first and second shoulders and biasing the sleeve to the coupling position, and with the first shoulder intermediate the spring and the first annular groove.

18. The chuck for the bit as claimed in claim 1, with the body including a longitudinal through-hole including the longitudinal axis and the engaging groove receiving the bit, with the longitudinal through-hole further including a coupling groove formed in the first end of the body and spaced from the engaging groove along the longitudinal axis, with the coupling groove releasably coupled with the tool, with the longitudinal through-hole further including an intermediate section between the engaging groove and the coupling groove, with the body further including a magnet mounted in the intermediate section of the longitudinal through-hole and adapted for attracting and retaining the bit in the engaging groove.

19. The chuck for the bit as claimed in claim 1, with the flange formed on an end of an outer periphery of the body and around the second compartment, with the flange including a first frictional outer periphery for providing friction when the sleeve is manually rotated about the longitudinal axis by rotating the first frictional outer periphery, with the sleeve further including an annular protrusion formed on another end of the outer periphery thereof and around the first compartment, with the flange including an end face facing the annular protrusion, with the end face adapted to be gripped by the user for moving the sleeve from the coupling position to the releasing position, and with the annular protrusion including a second frictional outer periphery for providing friction when the sleeve is manually rotated about the longitudinal axis by manually rotating the second frictional outer periphery.

20. The chuck for the bit as claimed in claim 19, with the first end of the body including a coupling groove, with the coupling groove being square in cross section and including four faces each having a recess adapted for releasably engaging with a ball of a drive column of a socket wrench.

* * * * *